United States Patent [19]

Piramoon

[11] Patent Number: 5,505,684
[45] Date of Patent: Apr. 9, 1996

[54] CENTRIFUGE CONSTRUCTION HAVING CENTRAL STATOR

[75] Inventor: Alireza Piramoon, Santa Clara, Calif.

[73] Assignee: Piramoon Technologies, Inc., Mountain View, Calif.

[21] Appl. No.: 288,387

[22] Filed: Aug. 10, 1994

[51] Int. Cl.$^6$ .................................................... B04B 9/02
[52] U.S. Cl. .......................... 494/16; 494/84; 210/512.1
[58] Field of Search .................................. 494/7, 16, 20, 494/83, 84; 210/512.1, 781

[56] References Cited

U.S. PATENT DOCUMENTS

| | | |
|---|---|---|
| Re. 33,813 | 2/1992 | von der Heide . |
| 3,902,658 | 9/1975 | Madsen ........................ 494/84 |
| 4,226,669 | 10/1980 | Vilardi ........................ 494/16 |
| 4,285,463 | 8/1981 | Intengan ...................... 494/84 |
| 4,341,343 | 7/1982 | Beckman ...................... 494/20 |
| 4,491,019 | 1/1985 | Wicki .......................... 494/7 |
| 4,498,896 | 2/1985 | Leis ............................ 494/16 |
| 4,521,706 | 6/1985 | Kudelski . |
| 4,616,149 | 10/1986 | Best . |
| 4,644,207 | 2/1987 | Catterfeld . |
| 4,647,803 | 3/1987 | von der Heide . |
| 4,656,553 | 4/1987 | Brown . |
| 4,659,951 | 4/1987 | Angi . |
| 4,670,003 | 6/1987 | Moroz . |
| 4,738,656 | 4/1988 | Piramoon . |
| 4,779,165 | 10/1988 | Elsaesser . |
| 4,781,669 | 11/1988 | Piramoon . |
| 4,790,808 | 12/1988 | Piramoon . |
| 4,817,453 | 4/1989 | Breslich, Jr. ................ 494/16 |
| 4,824,429 | 4/1989 | Keunen ...................... 494/16 |
| 4,843,292 | 6/1989 | Ono . |
| 4,860,610 | 8/1989 | Popper ........................ 494/16 |
| 4,882,511 | 11/1989 | von der Heide . |
| 4,883,999 | 11/1989 | Hendershot . |
| 4,972,110 | 11/1990 | Gorodissky .................. 494/84 |
| 5,023,499 | 6/1991 | Kuwahara . |
| 5,057,071 | 10/1991 | Piramoon . |
| 5,206,988 | 5/1993 | Piramoon . |
| 5,229,671 | 7/1993 | Neidhard . |
| 5,239,961 | 8/1993 | Neidhard . |
| 5,304,879 | 4/1994 | Suzuki . |

FOREIGN PATENT DOCUMENTS

| | | | |
|---|---|---|---|
| 0041360 | 12/1929 | Denmark ................................ | 494/84 |
| 0608424 | 8/1994 | European Pat. Off. . | |
| 383422 | 4/1990 | Germany . | |
| 2069242 | 8/1976 | U.S.S.R. . | |
| 3497720 | 10/1982 | U.S.S.R. . | |
| 3555263 | 2/1983 | U.S.S.R. . | |
| 1242242 | 7/1986 | U.S.S.R. . | |
| 1489842 | 6/1989 | U.S.S.R. ................................ | 494/84 |
| 2234639 | 2/1991 | United Kingdom . | |

Primary Examiner—David Scherbel
Assistant Examiner—Randall E. Chin
Attorney, Agent, or Firm—Townsend and Townsend and Crew

[57] ABSTRACT

A centrifuge construction is disclosed in which a centrally located stator directly drives a peripheral ring shaped centrifuge rotor. In the preferred embodiment, a centrifuge drive is disclosed which includes a stationary, central and usually cylindrical stator having stationary electrical windings for generating a rotating and driving magnetic field. The ring shaped centrifuge rotor is supported by at least one bearing relative to the stator and includes a large central aperture defined by the inside of the ring which enables the rotor to fit over and rotate about the stator. At portions of the rotor adjoining the stator, the rotor is constructed from materials which are entrained by the rotating magnetic field. The centrifuge rotor containing samples undergoing centrifugation is directly driven from the stator by entrainment of the rotor with the rotating and driving magnetic field generated from the electrical windings of the stator. In the usual case, this large central aperture in the rotor requires the use of composite materials in the rotor to resist radial centrifugal forces generated during centrifugation with hoop stress resistance from wound composite material fibers.

52 Claims, 10 Drawing Sheets

CENTRIFUGE CONSTRUCTION HAVING CENTRAL STATOR

This invention relates to a centrifuge construction. Specifically, a centrifuge is disclosed in which a stationary central stator directly drives a ring shaped centrifuge rotor, the centrifuge rotor in the usual case being fabricated from so-called composite materials.

BACKGROUND OF THE INVENTION

Figure 1:
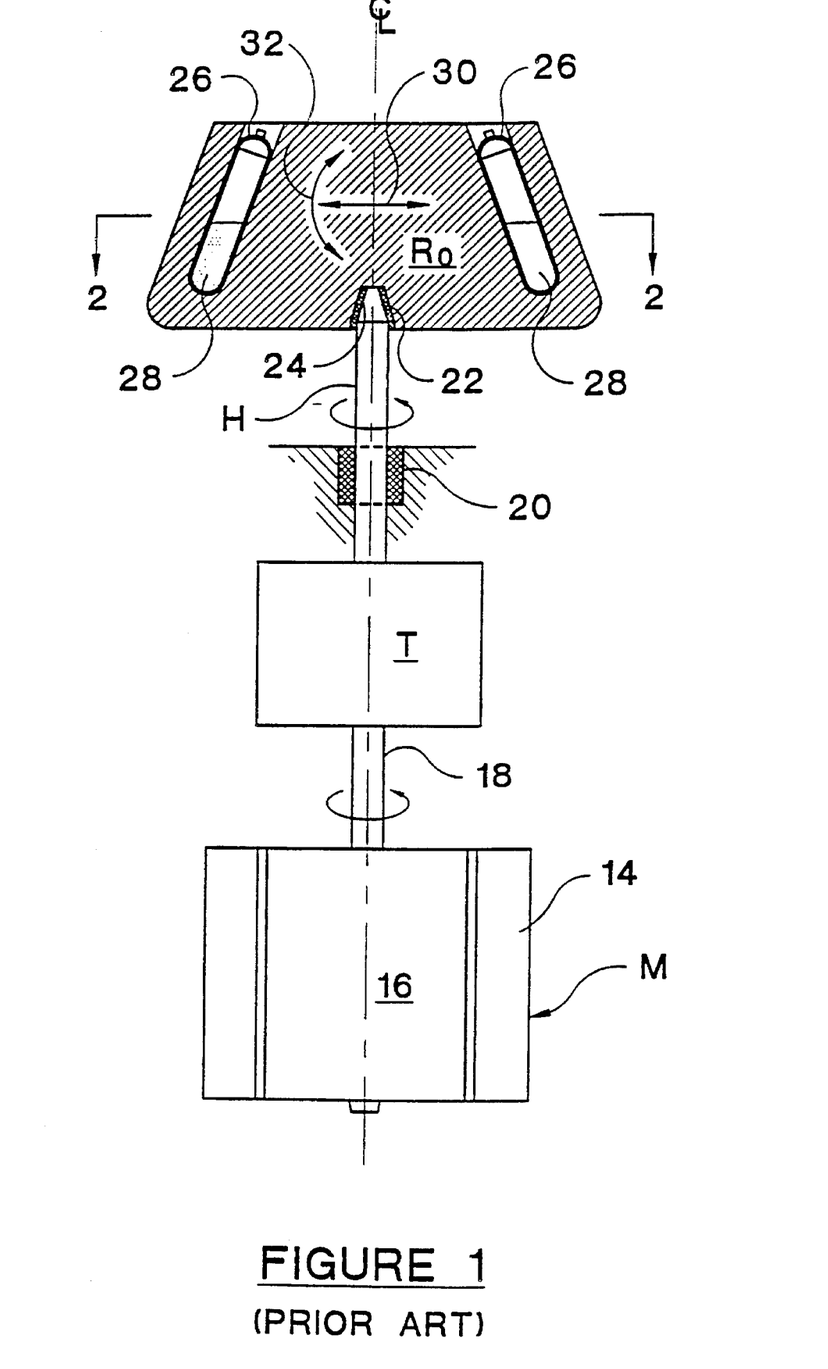
FIG. 1 is a schematic of a conventional centrifuge of the prior art illustrating the main components of such a centrifuge.

Centrifuge construction of the prior art can be simply set forth. Referring to FIG. 1, such construction consists of the following:

1. Driving motor M is utilized consisting of an exterior stator 14 and central and driven interior rotor 16, this rotor driving output shaft 18 from the motor;
2. Rotor support shaft H is present having supporting bearing 20 transmitting rotating force from output shaft 18 of driving motor M to both support and rotate prior art centrifuge rotor $R_O$ at male coupling 22;
3. Usually, transmission T is provided between output shaft 18 of driving motor M and rotor support shaft H, this transmission consisting either of a belt and pulley drive or suitable gearing; and,
4. Prior art centrifuge rotor $R_O$ is supported at female coupling 24 matching to male coupling 22 of rotor support shaft H. Prior art centrifuge rotor $R_O$ is cylindrical. As in all centrifuges, sample to be centrifuged is contained in the rotor. Here, sample tubes 26 are provided to hold samples 28 undergoing centrifugation. Alternatively, rotor modification can be present for either batch centrifugation or the continuous circulation of materials to be centrifuged to and from the rotor during centrifugation.

The primary difficulty of the prior art is vibration from the combination of the driving motor M, rotor support shaft H, and prior art centrifuge rotor $R_O$ as the rotor undergoes high speed rotation. A discussion of the types of vibration can be helpful. Rotation ranges of centrifuge rotors can include up to 6,000 rpms for low speed centrifuges, up to 30,000 rpms for high speed centrifuges, and even up to 120,000 rpms for ultra-centrifuges.

Referring further to FIG. 1, rotor support shaft H will be seen to provide a columnar support of prior art centrifuge rotor $R_O$ from supporting bearing 20. Specifically, assume that a rotor imbalance exists. Such would be the case where the center of gravity of the rotor is not co-incident to the spin axis of the rotor. During rotation of such a rotor, rotor support shaft H will be bent in a plane normal to the spin axis of the rotor from supporting bearing 20. This will cause transverse shaft vibration 30. When rotor support shaft H and supporting bearing 20 undergoes stress, accumulated to a sufficient degree, it can cause centrifuge failure.

It is known that if prior art centrifuge rotor $R_O$ has imbalance in a vertical plane, rapid stress reversal in rotor support shaft H can occur. Simply stated, if prior art centrifuge rotor $R_O$ has imbalance in a vertical plane, the rotor bends rotor support shaft H each time the support shaft rotates with shaft stress reversing vibration 32. This shaft stress reversing vibration 32 is transmitted directly through male coupling 22 and female coupling 24 to rotor support shaft H.

Stress reversals on a rapidly rotating shaft accumulate over a relatively short operating lifetime cause premature fatigue failures in the metallic structure of the shaft. When it is remembered that any kind of a failure in a high speed rotating centrifuge shaft is catastrophic—usually causing disintegration of the high speed rotor—such vibrations are to be carefully avoided.

To these vibrational components can be added torsional vibrations between driving motor M and prior art centrifuge rotor $R_O$. Specifically, driving motor M, either alone or through transmission T, can provide an irregular rotating force to prior art centrifuge rotor $R_O$. For example, driving motor M can provide an irregular rotating force which contains small torsional accelerations and decelerations. This irregular rotating force can superimpose a torsional vibration upon the high speed rotation of the centrifuge. Typically, central and driven interior rotor 16 of driving motor M torsionally vibrates with respect to prior art centrifuge rotor $R_O$. This torsional vibration is translated between prior art centrifuge rotor $R_O$ and central and driven interior rotor 16 of driving motor M through male coupling 22 and female coupling 24 to rotor support shaft H, transmission T, output shaft 18. Again, the system undergoes vibrational stress—this time in torsion.

The vibrational modes set forth above are relatively simple to explain, but extremely difficult to eliminate as a practical matter. Specifically, these vibrational modes are usually not confined to a single frequency, but include many frequencies. Further, it is well known that such vibrational frequencies "resonate" at certain "critical" frequencies. For example, a change of a rotor—for example substituting a light rotor for a heavy rotor—can change the critical frequency at which the centrifuge drive vibrates. A centrifuge which does not appreciably vibrate with one rotor, can be found to vibrate excessively with another rotor. Consequently, replacement rotor design can be adversely affected by vibrational considerations.

As a direct result of these vibrational modes and generated forces, it is common for centrifuge manufacturers to retain whole engineering departments for the suppression of such vibrations.

In what follows, a new centrifuge design will be presented which naturally suppresses many of these modes of vibration. Such a centrifuge happens to require as a practical matter the use of a ring shaped composite fiber reinforced centrifuge rotor.

The construction of fiber reinforced centrifuge rotors is well known. Such rotors have light weight combined with resistance to the high stress forces imposed during centrifugation, these forces being generally normal to the plane of the spin axis of the rotor. See for example, Piramoon et al. U.S. Pat. No. 4,738,656 issued Apr. 19, 1988 entitled COMPOSITE MATERIAL ROTOR; Piramoon U.S. Pat. No. 4,781,669 issued Nov. 1, 1988 entitled COMPOSITE MATERIAL CENTRIFUGE ROTOR; Piramoon U.S. Pat. No. 4,790,808 issued Dec. 13, 1988 entitled COMPOSITE MATERIAL CENTRIFUGE ROTOR; Piramoon U.S. Pat. No. 5,057,071 issued Oct. 15, 1991 entitled HYBRID CENTRIFUGE ROTOR; U.S. Pat. No. 5,206,988 issued May 4, 1993 entitled HYBRID ULTRA-CENTRIFUGE ROTOR WITH BALANCING RING AND METHOD OF MANUFACTURE. All of these particular rotors relate to so-called vertical tube rotors, where the tubes containing the sample are aligned parallel to the spin axis of the rotor. For the purposes of understanding the possible constructions of the rotors of this invention, these above listed patents are incorporated herein by reference.

In an International Application published under the Patent Cooperation Treaty on Dec. 23, 1993 entitled FIXED-ANGLE COMPOSITE CENTRIFUGE ROTOR by Malekmadani et al., a fixed angle rotor of which I am the omitted inventor, is described. In that disclosure a fixed angle rotor with oblique windings on a conical exterior was provided. The purpose of the oblique windings is to provide a composite rotor with resistance to the forces of vertical separation generated by sample tubes in fixed angle rotors. Rotors having this configuration have been sold more than one year prior to the filing of this patent application; consequently the rotor described in that publication is prior art to this patent application. For the purposes of understanding the possible constructions of the rotors of this invention, this disclosure is incorporated herein by reference.

DISCLOSURE NOT PRIOR ART

In the above summarized constructions, there are two phases to fabrication of a centrifuge rotor from composite material. The first phase involves laminating a composite billet or disc as the main structural part. Lamination is done with discrete layers of composite tape or fabric which are cut and laid-up one on another. Each discrete layer contains elongate lengths of fiber which are in the plane of the tape or fabric of the layer.

In the fabrication of a rotor, successive laminations are individually cut and thereafter laid one upon another. Typically, fibers in one laminate are laid in a first angular direction with fiber in an adjacent laminate laid in a second and different angular direction. A single rotor is constructed of many such laminates, all laid with their respective fibers at differing angles. Thereafter, the entire mass is cured with resin to form what I term a "quasi-isotropic" resistance to the forces of centrifugation, a resistance which is vastly superior to that provided by conventional metallic rotors.

Heretofore, such lamination and cutting in most cases has been done manually. It is to be noted that I propose to automate this lay-up procedure. See my AUTOMATIC LAY-UP MACHINE FOR COMPOSITE FIBER TAPE, Ser. No. 08/249,502, filed May 26, 1994. This disclosure is incorporated by reference herein.

Thereafter, and for the second phase, the rotor is typically wound with fiber. For example, see my co-pending U.S. Patent Application entitled FIXED ANGLE COMPOSITE CENTRIFUGE ROTOR FABRICATION WITH FILAMENT WINDINGS ON ANGLED SURFACES, Ser. No. 08/249,592, filed May 26, 1994. As this application discloses, this winding with fiber can have either a peripheral orientation or alternatively a vertical orientation. In both cases, reinforcement of the rotor to resist the forces of centrifugation results. This disclosure is incorporated by reference herein.

SUMMARY OF THE INVENTION

A centrifuge construction is disclosed in which a centrally located stator directly drives a peripheral ring shaped centrifuge rotor. In the preferred embodiment, a centrifuge drive is disclosed which includes a stationary, central and usually cylindrical stator having stationary electrical windings to electrically commute magnetic field through the rotor, in order to rotate the rotor about the vertical axis. The ring shaped centrifuge rotor is supported by at least one bearing relative to the stator and includes a large central aperture defined by the inside of the ring which enables the rotor to fit over and rotate about the stator. At portions of the rotor adjoining the stator, the rotor is constructed from materials which are entrained by the rotating magnetic field. Four windings for 2-phase commutation where the poles of the stator are energized as pairs of adjacent poles having opposite polarities so as to create a magnetic circuit between each of the pole pairs. In the usual case, this large central aperture in the rotor requires the use of composite materials in the rotor to resist radial centrifugal forces generated during centrifugation with hoop stress resistance from wound composite material fibers.

Over the prior art, many centrifuge components are eliminated. Specifically, the separate driving motor and its central and driven interior rotor and output shaft are eliminated. Further, the rotor support shaft, the transmission mechanism, the male rotor coupling, and the female rotor coupling are no longer required. In place and instead of these multiple components there is provided the single central and stationary stator, a magnetically driven and rotating ring shaped central centrifuge rotor, and at least one bearing between the central stationary stator and the outer directly driven centrifuge rotor.

All vibrational problems are vastly simplified as a direct result of the simplified centrifuge construction. Vibrations having a transverse shaft vibration component can either be resisted by central bearings directly mounted to the stator at the top and bottom of the rotor or absorbed by flexible bearing configurations from the stator. Since the rotor support shaft is eliminated, shaft vibrations and torsional vibrations between motor rotor and centrifuge rotor are not present.

With the elimination of these vibrational considerations, construction of the centrifuge is vastly simplified, both with respect to cost and vibrational interaction of the rotor components. Further, rotor interchangeability no longer requires vibrational considerations related to the eliminated conventional centrifuge components. A much simplified centrifuge construction results.

DESCRIPTION OF THE PREFERRED EMBODIMENT

Figure 3:
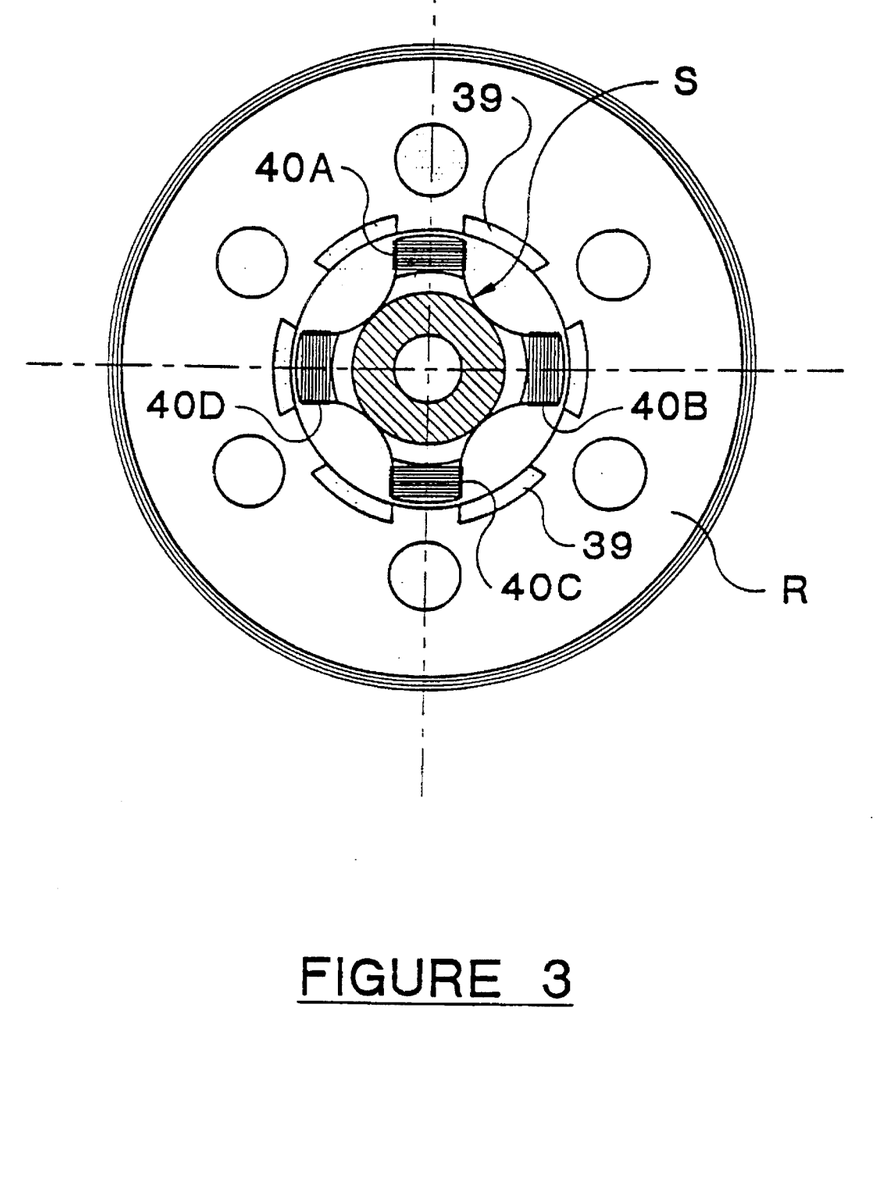
FIG. 3 is a plan view of the rotor and stator of this centrifuge illustrating the principal components of the centrifuge construction.
Figure 4:
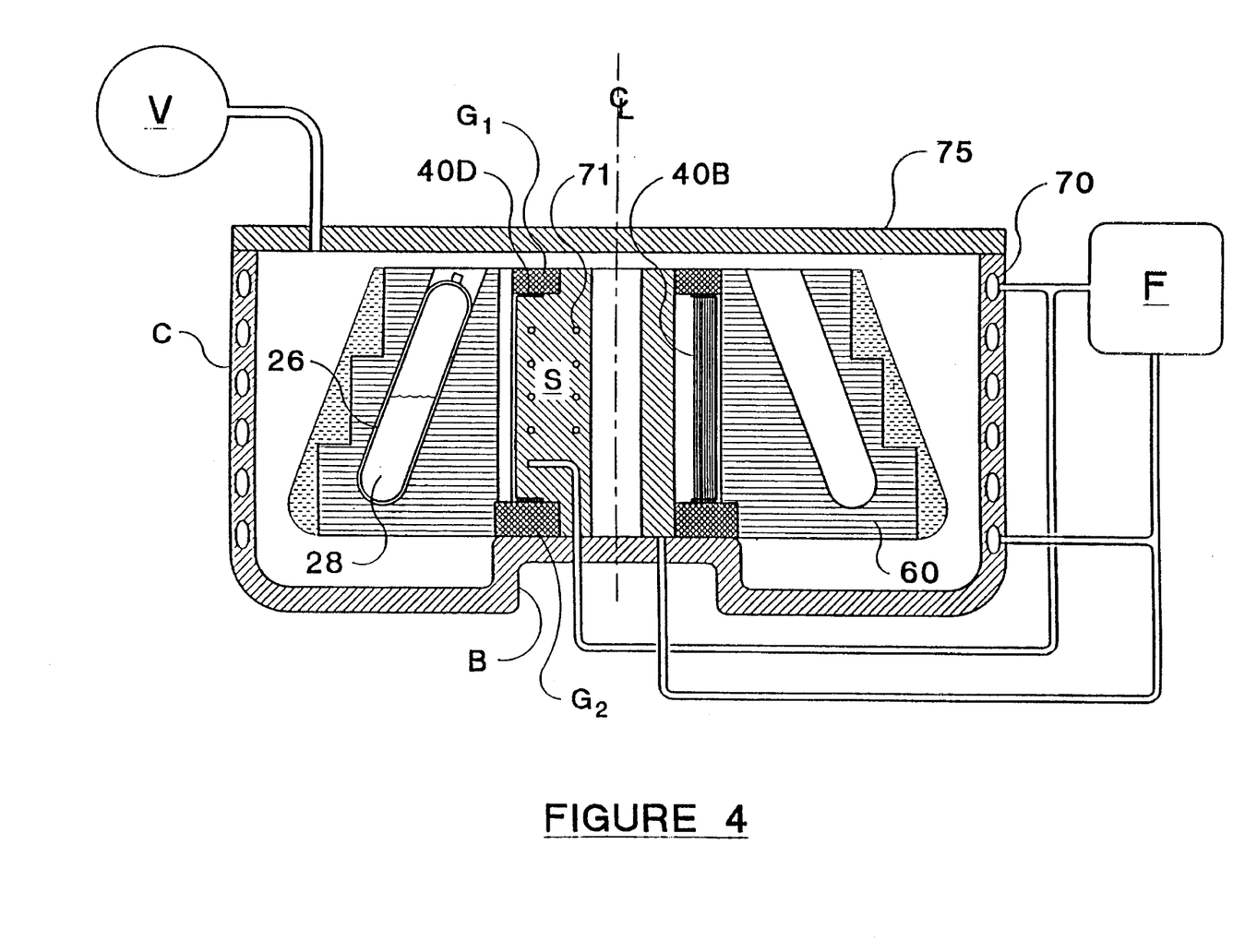
FIG. 4 is a side elevation at the spin axis of the centrifuge of FIG. 3 also illustrating the container or can in which the centrifuge rotor rotates for the purposes allowing centrifugation to occur in an evacuated, refrigerated environment.
Figure 5:
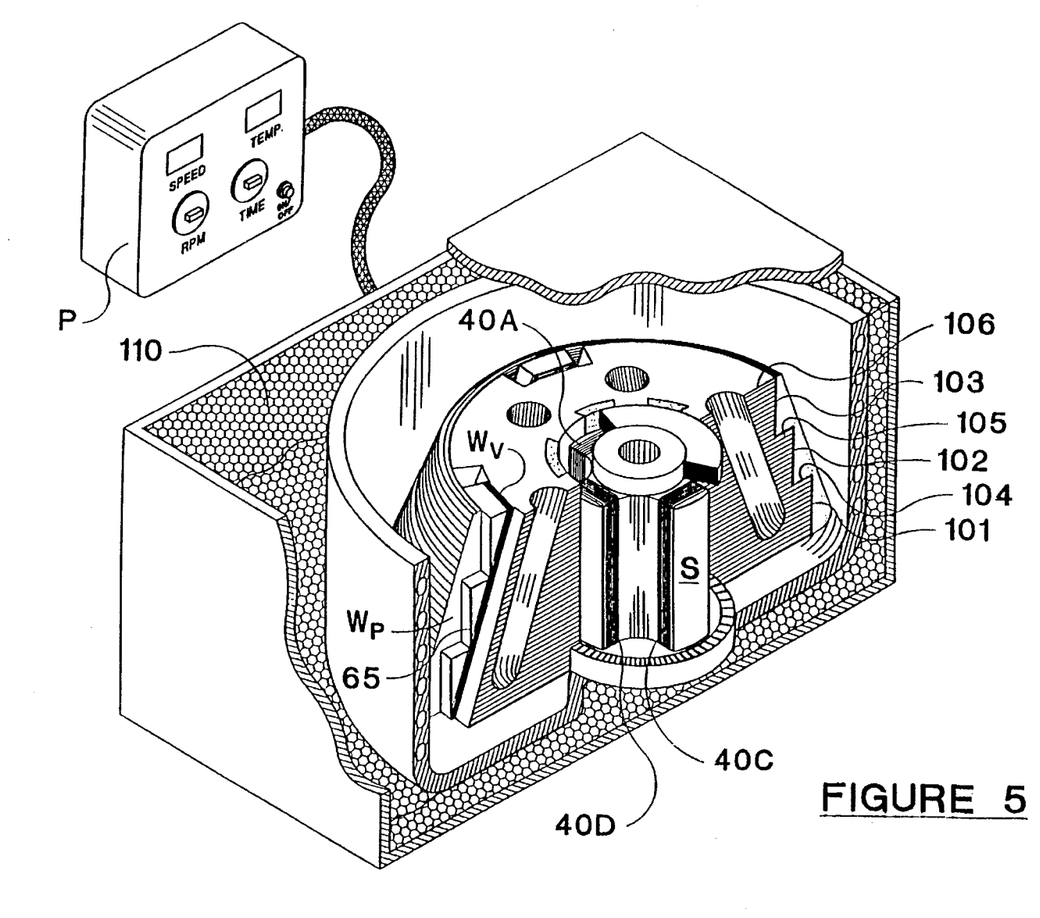
FIG. 5 is a perspective sectional view of a centrifuge similar to FIG. 4 constructed in accordance with this invention illustrating a complete centrifuge according to this invention having additionally a stator drive, and a surrounding honeycomb barrier for providing the required safety configuration to absorb the possible forces of rotor disintegration.

Referring to FIGS. 3–5, the centrifuge of this invention is generally disclosed. Central stationary stator S is illustrated. In the preferred embodiment, central stationary stator S is cylindrical and mounted to base B of the centrifuge.

Central stationary stator S here includes four electrical windings 40A–40D. As illustrated in FIG. 5, these respective windings are connected to a variable reluctance motor controller/driver such as that manufactured by Semifusion of Morgan Hill, Calif. Wiring is conventional; the only difference is that central stationary stator S is not peripheral to rotor R, it is central to rotor R.

Rotor R is easy to understand. It includes a large central aperture A. Like central stationary stator S, large central aperture A is cylindrical and slightly exceeds the dimension of central stationary stator S. When rotor R is placed over central stationary stator S, clearance is defined between central stationary stator S and rotor R at the inside of large central aperture A. Large central aperture A is here shown having grooves 39 which provide a venting co-action with stator S.

It is to be understood that central stationary stator S produces torque following the principles of variable reluctance motors. As will be seen, rotor R, having high magnetic permeability, rotates in synchrony with angular position of the magnetic field with respect to the stator.

Figure 8:
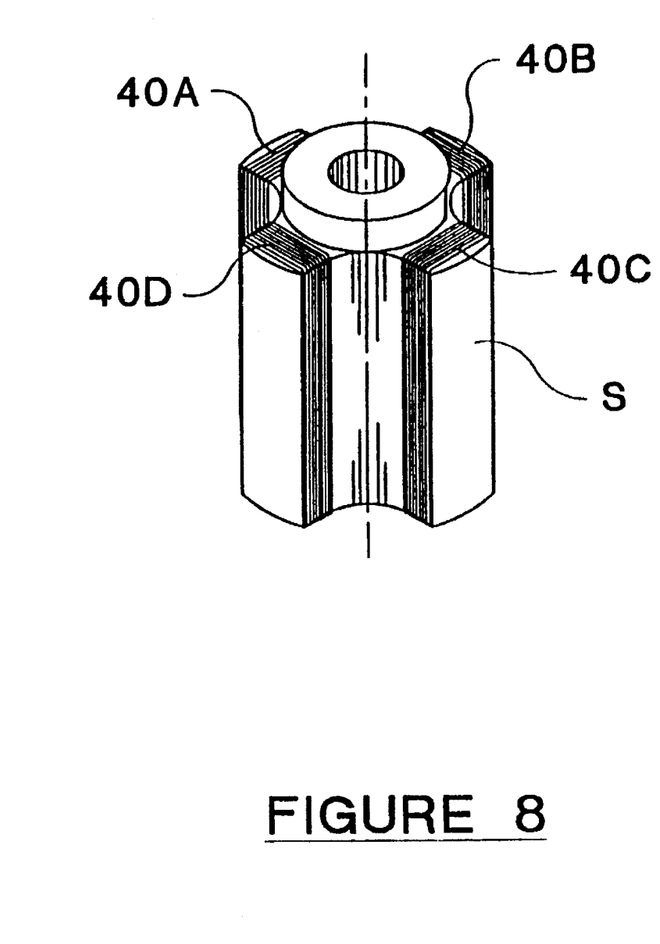
FIG. 8 is a view of a typical four winding, two-phase stator.
Figure 9:
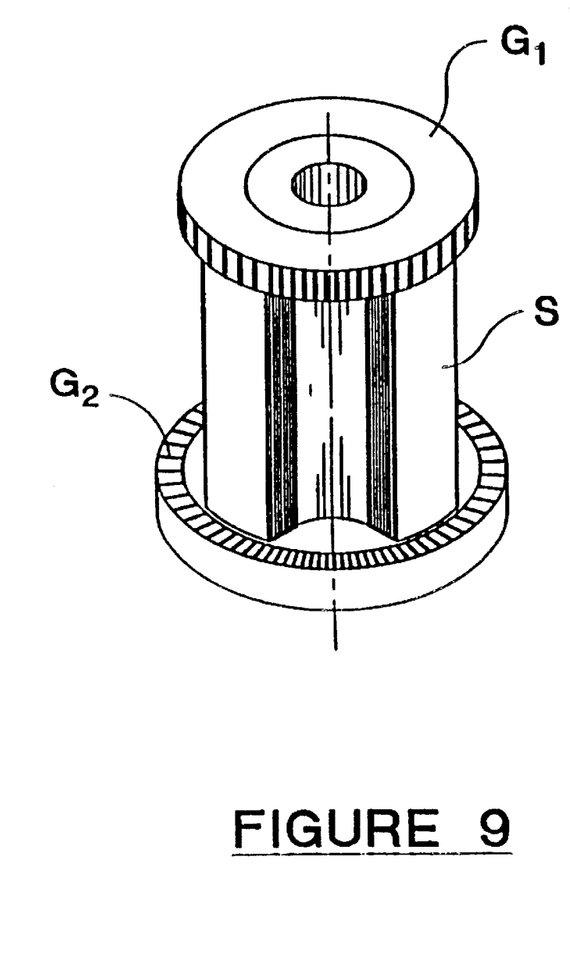
FIG. 9 illustrates the stator of FIG. 8 with the stator used to anchor bearings; and, FIG. 10 is a view of an alternate and not preferred embodiment of this invention in which a large central stator has a portion of a rotor interior of the stator and the working portion of the rotor containing the sample to be centrifuged exterior of the stator.

Rotor R is typically supported for rotation on central stationary stator S by at least one bearing $G_1$ or $G_2$. In the embodiment here shown, first top bearing $G_1$ and second bottom bearing $G_2$ are used (see FIGS. 8 and 9). These respective bearings enable substantially friction free rotation of rotor R relative to central stationary stator S. It will be noted that bottom bearing $G_2$ provides both vertical and radial support while top bearing $G_1$ provides radial support for rotor R.

Given the combination of top bearing $G_1$ and bottom bearing $G_2$ it will be understood that a design having high resistance to rotor imbalance is disclosed. Specifically, central stationary stator S because of its large cylindrical diameter is a highly stable member for attachment of top bearing $G_1$ and bottom bearing $G_2$.

This latter feature is in sharp contrast to the situation illustrated in FIG. 1. Specifically, and because of the essential columnar support on rotor support shaft H, any imbalance of prior art centrifuge rotor $R_O$ can cause unacceptable vibration. Such imbalances can include eccentric loading of samples 28 in sample tubes 26 by customers utilizing the centrifuge. In short, by allowing central stationary stator S to form an essentially rigid support for top bearing $G_1$ and bottom bearing $G_2$, rotor R has high resistance to eccentric rotor forces.

Entrainment of rotor R to follow the rotating magnetic field of central stationary stator S can occur in any number of conventional ways. The reader is to understand that any suitable type of standard motor design providing a magnetic connection between stator and rotor can be used. For example, I prefer a variable reluctance motor design. Alternatively, other types of motors could be used as well.

Figure 6A:
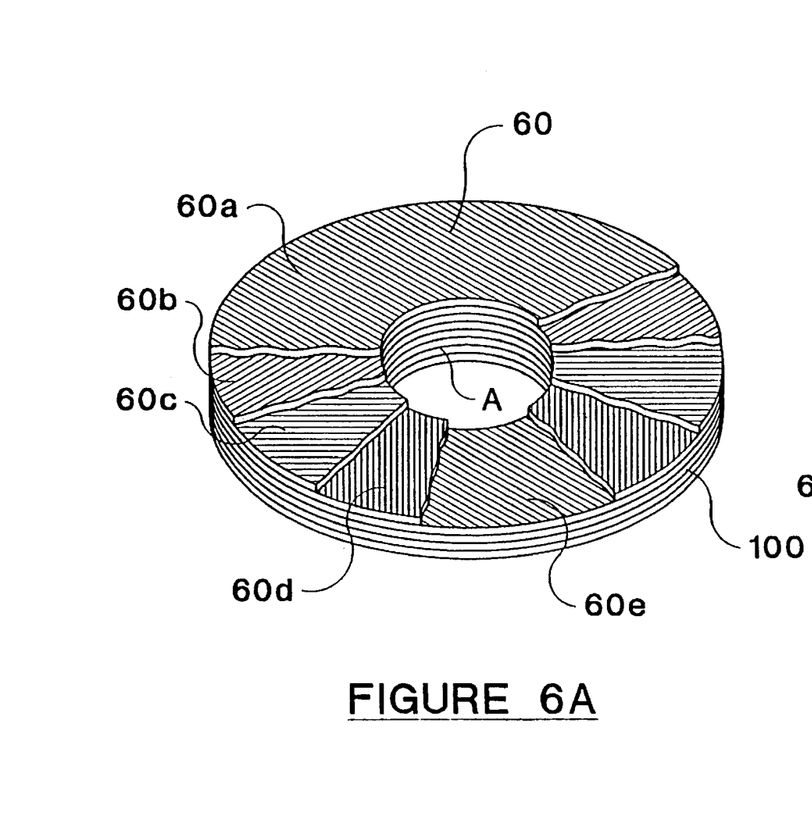
FIGS. 6A and 6B are perspective views of the fabrications of the composite ring segments of this invention which when assembled can form the ring shaped rotor of this invention.
Figure 6B:
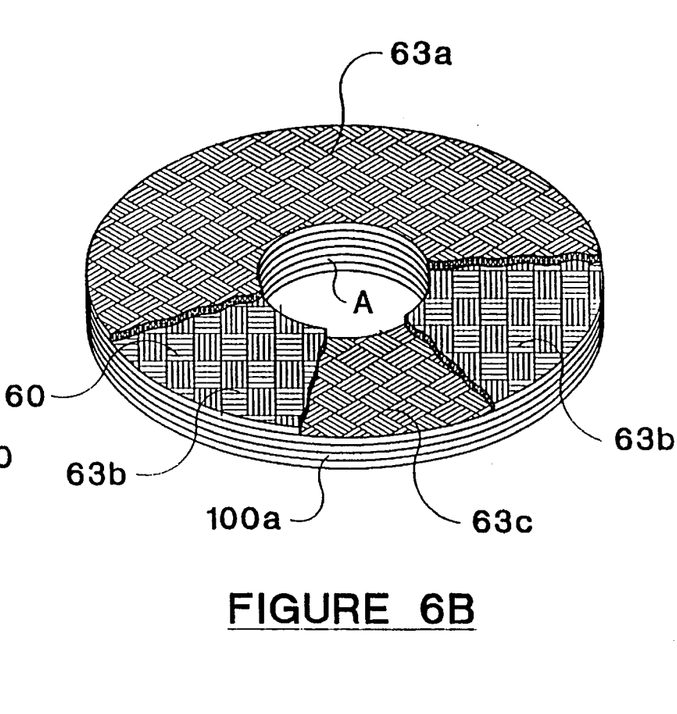
Figure 6C:
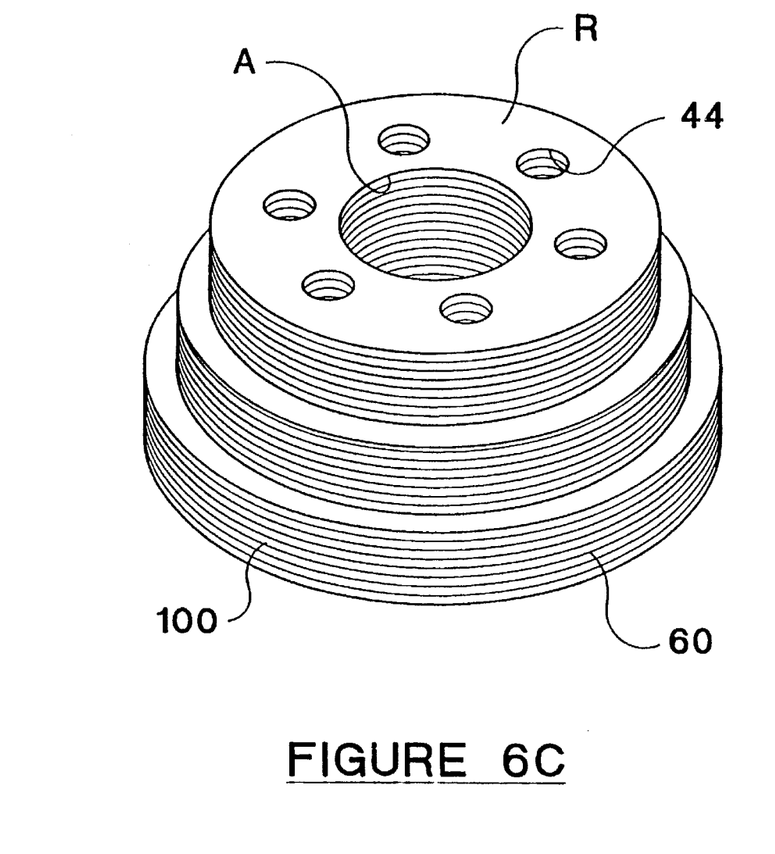
FIGS. 6C and 6D are perspective views of the composite ring segments of FIGS. 6A or 6B assembled, with FIG. 6C showing the rotor before peripheral winding and FIG. 6D illustrating the rotor in perspective section.
Figure 6D:
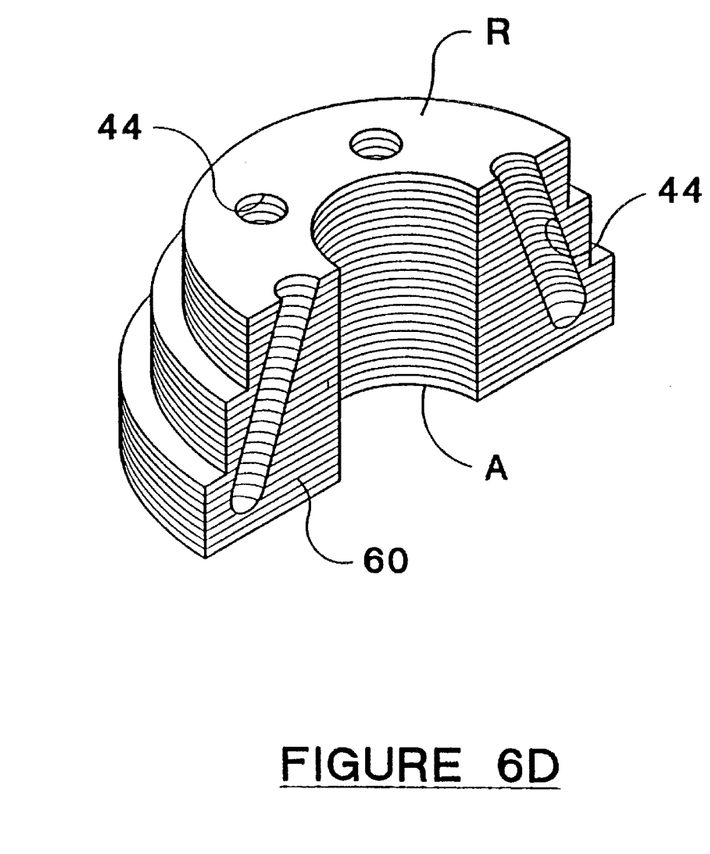
Figure 7:
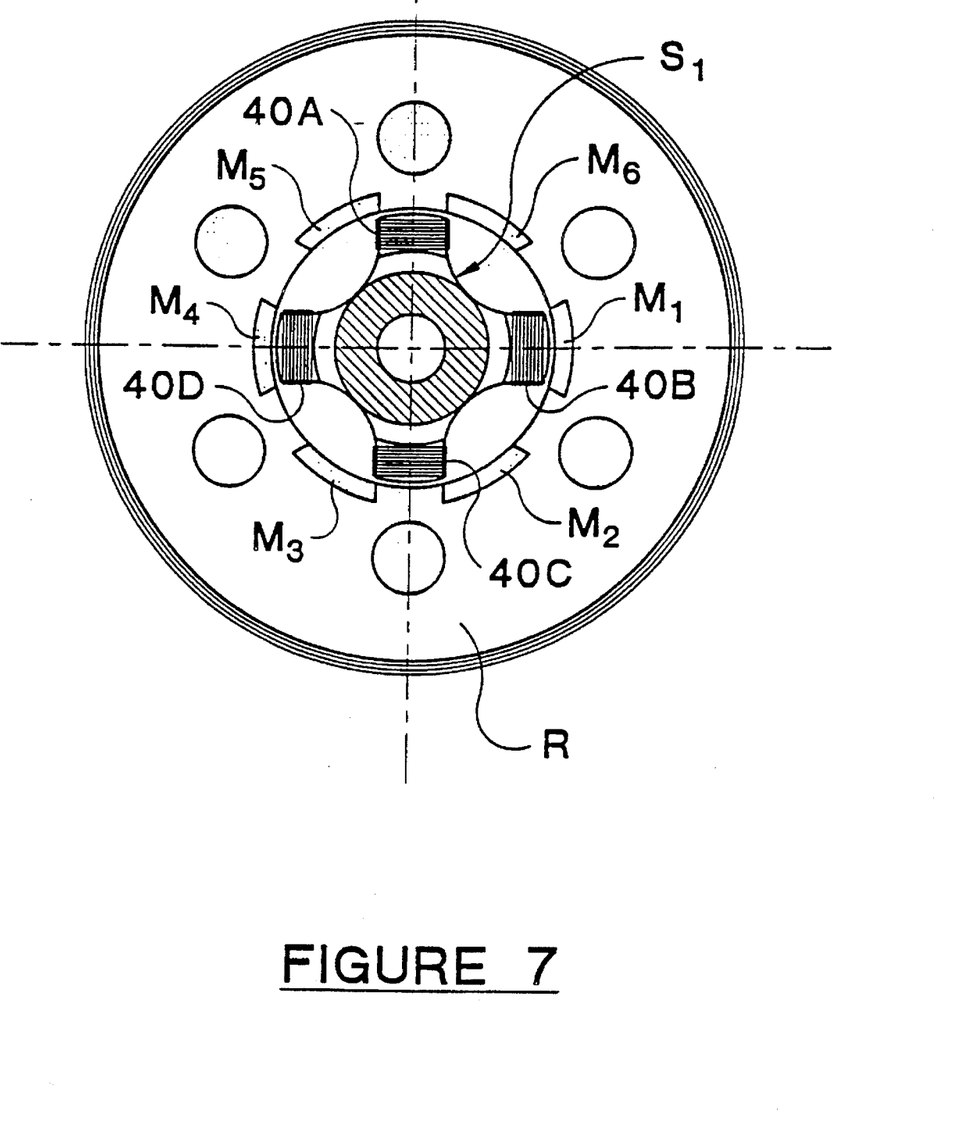
FIG. 7 is a plan view of a centrifuge of this invention illustrating a stator coupling to a rotor having permanent magnets installed interior of the large central aperture of the ring shaped rotor.

By way of example, in FIG. 7, I illustrate a rotor having permanent magnets $M_1$–$M_6$ in rotor R on the inside of large central aperture A. In this case, non-magnetic laminates such as $60_a$–$60_e$ in FIG. 6. cn be utilized. It is sufficient to say that any motor scheme which enables an external rotor to rotate by means of a magnetic field produced by a stator is sufficient for the practice of this invention.

For example, I have referred to a rotating magnetic field. This rotating magnetic field is intended to include "switched" fields as well. Further, rotors for motors are known to include brushes communicating current to windings in the rotor. While I do not specifically illustrate such a design, it can be utilized with this invention.

Rotor R is otherwise conventional. It is constructed of so-called composite materials. In FIGS. 6A–6D, rotor R is illustrated as a so-called fixed angle rotor having inclined sample tubes 26 in inclined rotor sample apertures 27 having samples 28 to be centrifuged. A brief review of the construction of rotor R is believed instructive.

Referring to FIG. 6A, rotor ring section 100 is illustrated constructed of fiber laminate sections 60a–60e. It will be note that differing and adjacent fiber laminates have their respective fibers running in differing directions. Alternately, and as shown in FIG. 6B, rotor ring section 100a is shown constructed of laminates 63a–63c having woven composite fiber. Again, fiber of adjacent laminates is oriented in differing directions.

Referring to FIGS. 6C and 6D, assembly of rotor ring sections 100 is illustrated. Specifically, by varying the external diameter of the respective laminates as well as the aperture in the laminates for sample tube apertures 44, rotor R construction prior to the installation of peripheral component windings $W_P$ and vertical component windings $W_V$ can be substantially completed.

With regard to large central aperture A in rotor R, it is to be understood that such a rotor could not be practically constructed utilizing conventional prior art metal rotor construction. Some discussion of this practical limitation is warranted.

Figure 2:
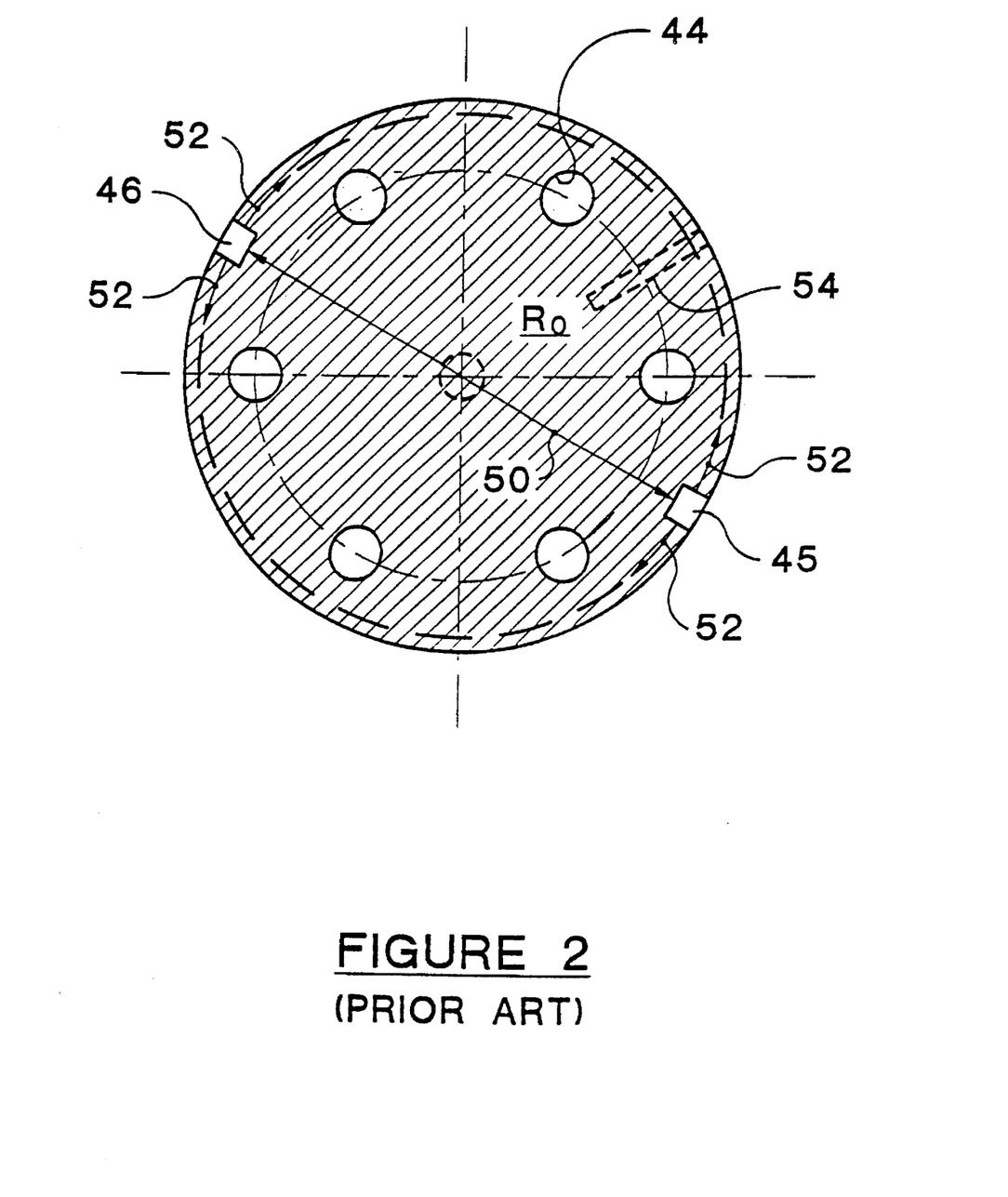
FIG. 2 is a schematic cross section of prior art centrifuge rotor of FIG. 1 illustrating resistance of the rotor to disintegration through tensile components including radial tensile components and hoop stress tensile components.

Referring to FIG. 2, a section through prior art centrifuge rotor $R_O$ along lines 2—2 of FIG. 1 is illustrated. This illustration does not include large central aperture A of rotor R.

When a conventional centrifuge rotor undergoes centrifugation, it is well known that forces are imposed upon the rotor relative to the spin axis of the rotor which literally tend to tear the rotor apart. Oversimplified, each portion of the centrifuge rotor tries to radially separate relative to the spin axis of the rotor. For example, rotor portion 45 tries to move away from rotor portion 46.

In the prior art, a conventional rotor resisted such separation with two mechanisms. The first of these mechanisms is radial tensile component 50 of resistance distributed radially with respect to the spin axis of the rotor. In short, the substantially continuous metal material of the rotor acts in tension through the spin axis of the rotor to maintain the rotor together against the forces of centrifugation.

The second of these mechanisms is hoop stress tensile component 52 of resistance distributed concentrically about the rotor spin axis. Specifically, and since the isotropic structure of the metallic rotor has a uniform resistance to tensile forces in all directions, the rotors act in part as if they are constructed of concentric hoops. When the rotors rotate, forces tending to separate the rotor are resisted by tensile forces in the metal relative to the spin axis which generate a hoop stress resisting tension in the structure of the rotor.

In actual practice, the propensity of a rotor to resist disintegration is a combination of both radial tensile component and the hoop stress tensile component. If the rotor is fabricated so that either of these components are eliminated from the rotor, the forces of centrifugation cause rotor destruction at very much lower speeds. For example, a rotor having radial slots 54 (shown in broken lines in FIG. 2) at the periphery extending inwardly toward the spin axis of the rotor would be a poor design choice. These radial slots would interfere with hoop stress tensile component 52 of the rotor. Such a rotor could be expected to disintegrate at much lower speed than a rotor without such radial slots.

In the rotor construction of this invention, there is required to be large central aperture A within rotor R. This large, single central aperture is required to accommodate the central stationary stator. The presence of this large, single central aperture substantially reduces the radial tensile component of resistance to rotor disintegration.

Fortunately, and through the improved resistance in tension of composite fiber construction, what the rotor loses in the radial tensile component can be successfully resisted by composite fiber rotor construction. Specifically, since such composite materials have four times the strength and one third of the weight of titanium, a practical rotor construction of composite materials is possible, even though forces of radial tension across the spin axis of the rotor are substantially absent.

For purposes of this disclosure, such a rotor R includes laminates 60 having fibers disposed normal to the spin axis of rotor R. Windings of composite fiber are preferably included. For example, and referring to FIG. 5, I illustrate vertical component windings $W_V$ and peripheral component windings $W_P$ placed on stepped surfaces 65 of rotor R.

In my co-pending patent U.S. patent application entitled FIXED ANGLE COMPOSITE CENTRIFUGE ROTOR FABRICATION WITH FILAMENT WINDINGS ON ANGLED SURFACES, Ser. No. 08/249,592, filed May 26, 1994, I describe the function of such windings. Specifically, rotor R is illustrated fabricated from lower ring 101, middle ring 102, upper ring 103. These respective rings are manufactured from discrete laminates having composite fibers with the fibers of differing layers having differing angularity to impart from the anisotropy of the fiber of the layers a "quasi-isotropic" strength normal to the spin axis of the rotor. Thus, the rings have high resistance to forces tending to separate the rotor normal to the spin axis of the rotor.

These respective rings 101–103 define lower ring step 104, middle ring step 105, and upper ring step 106 on their respective outside edge. These steps preferably are normal to the spin axis of the rotor. Peripheral component windings $W_P$ of FIG. 5 are wound about these respective steps. Such peripheral component windings $W_P$ constitute resin impregnated fiber which is typically serially wound and keys to the respective steps at their surfaces where they are normal to the spin axis of the rotor. It is to be understood that during curing, such fibers typically contract a small amount. In such contraction, the fibers stress the respective rings 101–103 with hoop tension. This hoop tension translates to a radial compressive force on rotor R. As relates to large central aperture A, the radial compressive tension supplied by peripheral component windings $W_P$ is an ideal substitute for that radial tensile component which cannot be transmitted across the spin axis of the rotor R because of large central aperture A.

Additionally, and in the case of so-called fixed angle rotors, vertical component windings $W_V$ are sometimes required. I have noted that sample tubes 26 can possibly exert on rotor R a vertical stressing component. In the case of rotor R this force is exerted between the individual laminates 60 making up rotor R. By either placing vertical component windings $W_V$ over the top of the respective rings 101–103, all laminates 60 can be reinforced against such forces of delamination.

Further detailed description of possible rotor construction with large central aperture A utilized herein can be found. I have previously disclosed the essential design of such a rotor. See for example, Piramoon et al. U.S. Pat. No. 4,738,656 issued Apr. 19, 1988 entitled COMPOSITE MATERIAL ROTOR; Piramoon U.S. Pat. No. 4,781,669 issued Nov. 1, 1988 entitled COMPOSITE MATERIAL CENTRIFUGE ROTOR; Piramoon U.S. Pat. No. 4,790,808 issued Dec. 13, 1988 entitled COMPOSITE MATERIAL CENTRIFUGE ROTOR; Piramoon U.S. Pat. No. 5,057,071 issued Oct. 15, 1991 entitled HYBRID CENTRIFUGE ROTOR; U.S. Pat. No. 5,206,988 issued May 4, 1993 entitled HYBRID ULTRA-CENTRIFUGE ROTOR WITH BALANCING RING AND METHOD OF MANUFACTURE. For further examples, see my co-pending U.S. patent application entitled FIXED ANGLE COMPOSITE CENTRIFUGE ROTOR FABRICATION WITH FILAMENT WINDINGS ON ANGLED SURFACES, Ser. No. 08/249,592, filed May 26, 1994. As this application discloses, this winding with fiber can have either a peripheral orientation or alternatively a vertical orientation. In both cases, reinforcement of the rotor to resist the forces of centrifugation results.

It may therefore be understood that a portion of this invention consists of realizing for the first time that composite materials can make a practical centrifuge possible having a rotor which accommodates a large, single central stator. Because such composite materials are ⅓ the mass of titanium and approximately four times as strong in tension, it is possible to have a centrifuge rotor R (see FIG. 3) or $R_1$ (see FIG. 7) with large central aperture A (see FIG. 3) or $A_1$ (see FIG. 7). Further, and as a direct result of the reduced mass, failure of such rotors is a less catastrophic event. For example, composite fiber rotors fail by generation of dust which can be readily contained by honeycomb barrier 110 illustrated in FIG. 5.

Fibers in laminates utilized with this invention can be fiberglass fibers, carbon fibers, and paraphenylene diamine terephtaloyl chloride (PPDT) fibers, for example Kevlar®, a registered trademark of E. I. DuPont of Wilmington, Del. Kevlar® has the generic name of Aramid and an abbreviated chemical name of PPDT, but is technically referred to as paraphenylene diamine terephtaloyl chloride.

It is to be understood that composite materials can be magnetically permeable, electrically conductive or resistive. In the embodiment of FIGS. 3–5, I prefer that laminates 60 are made of magnetically permeable fibers, to enable rotor R to be driven by magnetic fibers generated by central stationary stator S. Laminates 60 containing conductive coatings—preferably of nickel—are manufactured by Hexel Corporation of Dublin, Calif. and sold under the trade designation Thorstrand™.

With respect to laminates of magnetically permeable fibers, it will be understood that laminates 60 are extremely resistive to so-called "eddy currents" and their resultant rotor heating. Specifically, switched magnetic fields will generate such eddy currents with a major component parallel to the spin axis of the rotor. Since the magnetically permeable fibers are normal to the spin axis of the rotor and insulated one from another by the poured and cured resin, the rotor will be highly resistant to eddy currents parallel to the spin axis and the resultant heat.

The remaining components of the illustrated centrifuge are conventional. Specifically, base B is part of containment can C. This containment can C is conventionally refrigerated by integral coil passages 70 communicated to refrigeration system F. It should be noted that central stationary stator S can additionally be cooled utilizing stator integral coil passages 71. Because of such a configuration, heat is readily removed for centrifugation under refrigeration.

Further, and in order to conventionally reduce windage, containment can C at top 75 can be communicated to vacuum pump V. Regarding containment can C, it will be noted that a support shaft (such as rotor support shaft H of FIG. 1) is not required to penetrate containment can C from any motor (such as driving motor M of FIG. 1). Consequently, the detail of providing a bearing (such as supporting bearing 20 of FIG. 1) with a vacuum tight seal is not required.

The ratio of the diameter of large central aperture A to the total diameter of rotor R is instructive. I prefer the diameter of large central aperture A to maximum rotor R diameter to exceed 20%. Preferably, this diameter ratio will be 33% or more. Central stationary stator S will be dimensioned correspondingly.

I have previously stated that alternate designs of this invention are possible. For a non-preferred alternative, reference is made to FIG. 10.

Figure 10:
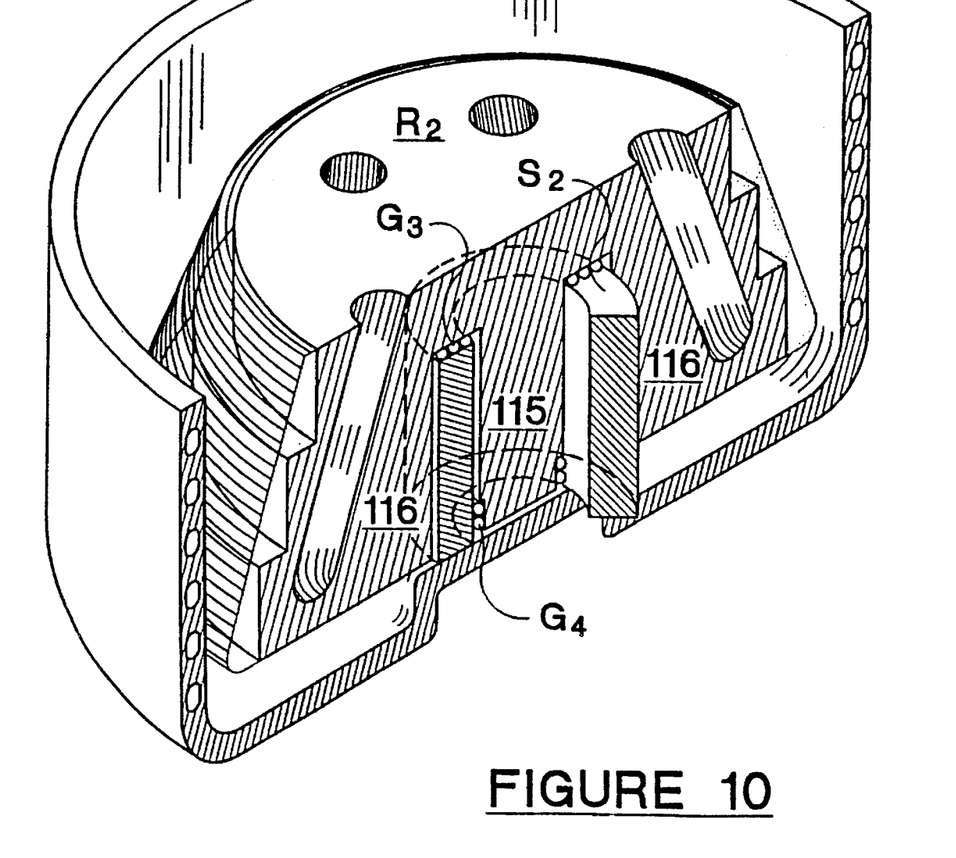

Referring to FIG. 10 rotor $R_2$ having a central rotor portion 115 and a peripheral rotor portion 116. This rotor forms a continuous structure over the top of stator $S_2$. Thus, coupling of rotor $R_2$ to a rotating magnetic field from either central rotor portion 115 or peripheral rotor portion 116 or both. The rotor includes top bearing $G_3$ and bottom bearing $G_4$.

I have illustrated an all composite fiber rotor bound together with resin. The reader will understand that this is the preferred construction. For certain applications, the rotor can be of hybrid designs, part metal and part composite fibers. Alternately, an all metal rotor can be used.

It will be seen that we disclose for the first time a centrifuge having minimal height. Further, this centrifuge eliminates many components of the prior art. With the elimination of these components, vibration problems of the prior art are considerably mitigated. Manufacturing cost is favorably impacted. A simple centrifuge having a single rotor— as opposed to a motor rotor and a centrifuge rotor— is set forth.

What is claimed is:

1. A centrifuge comprising:

a central stationary stator for producing a rotating magnetic field;

a rotor having a ring shaped portion mounted peripherally to said central stationary stator, said rotor including material entrained by said rotating magnetic field from said stator;

said rotor at said ring shaped portion mounted peripherally to said central stationary stator defining at least one aperture for receiving a sample for centrifugation; and, at least one bearing for mounting said rotor for rotation with respect to said stator.

2. A centrifuge according to claim 1 and further comprising:

said central stationary stator is a cylindrical stator; and, said rotor having a ring shaped portion defining a large central cylindrical aperture for fitting about said cylindrical stator.

3. A centrifuge according to claim 1 and further comprising:

said at least one bearing is mounted at a top of said stator for support of said rotor in rotation with respect to said stator.

4. A centrifuge according to claim 1 and further comprising:

said rotating magnetic field produced by said stator is a magnetic field exterior to said stator.

5. A centrifuge according to claim 1 and further comprising:

said magnetic field produced by said stator is a rotating magnetic field for a variable reluctance motor.

6. A centrifuge according to claim 1 and further comprising:

said rotor is symmetrical about a spin axis;

said rotor having a ring shaped portion including peripheral stepped surfaces having faces parallel to said spin axis of said rotor and said peripheral stepped surfaces are wound with composite fiber.

7. A centrifuge according to claim 1 and further comprising:

said rotor having a ring shaped portion is constructed of composite materials.

8. A centrifuge according to claim 1 and further comprising:

said rotor is concentric to said stator and includes a first section for rotating interior of said stator and a second integrally attached section having said ring shaped portion for rotating exterior of said stator.

9. A centrifuge according to claim 1 and further comprising:

said rotor is a fixed angle rotor.

10. A centrifuge according to claim 1 and further comprising:

said rotor is constructed of magnetically permeable material.

11. In a centrifuge having:

a rotor for containing at least one sample to be centrifuged;

at least one bearing for supporting and rotating said rotor; and, stator means for generating a rotating magnetic field to rotate said rotor on said bearing to centrifuge said sample; the improvement comprising:

a rotor having a ring shaped portion for fitting over said stator and rotating within said ring shaped portion said at least one sample to be centrifuged about said stator; and, means for entraining the magnetic field attached to said rotor for coupling to said rotating magnetic field of said stator.

12. The improvement in a centrifuge according to claim 11 and wherein:

said stator is a cylindrical stator and said rotating magnetic field is generated exterior of said stator.

13. The improvement in a centrifuge according to claim 11 and wherein:

said at least one bearing is mounted at a top of said stator for support of said rotor in rotation with respect to said stator.

14. The improvement in a centrifuge according to claim 11 and wherein:

said rotating magnetic field produced by said stator is a rotating magnetic field for a variable reluctance motor.

15. The improvement in a centrifuge according to claim 11 and wherein:

said rotating magnetic field produced by said stator is a rotating magnetic field exterior to said stator.

16. In a centrifuge having:

a single central stator for producing a rotating magnetic field;

a rotor for containing at least one sample to be centrifuged;

means to incorporate permanent magnets into said rotor to rotate with said rotating magnetic field; and, at least one bearing for supporting and rotating said rotor;

the improvement to said rotor comprising:

said rotor having a ring shaped portion to define a large single central aperture for rotating peripherally exterior of and about said stator.

17. The improvement in a centrifuge according to claim 16 and wherein:

said rotor is symmetrical about a spin axis;

said rotor includes peripheral stepped surfaces having faces parallel to said spin axis of said rotor and said peripheral stepped surfaces are wound with composite fiber.

18. The improvement in a centrifuge according to claim 16 and wherein:

said rotor is constructed of composite materials.

19. The improvement in a centrifuge according to claim 16 and wherein:

said rotor has a portion interior to said stator.

20. The improvement in a centrifuge according to claim 16 and wherein:

said rotor is constructed of magnetically permeable composite material.

21. The improvement in a centrifuge according to claim 16 and wherein:

said rotor is constructed of material including at least some magnetic material.

22. A rotor for a centrifuge comprising in combination:

a rotor body having a ring shaped portion symmetrical about a spin axis for said rotor;

said ring shaped portion having means for containing at least one sample eccentric to said spin axis;

said rotor including an inner periphery region defining a large single central and vacant aperture aligned concentrically about and along said spin axis; and, means for entraining said rotor with a rotating magnetic field positioned within the inner periphery region of said large single central and vacant aperture of the rotor.

23. A rotor for a centrifuge according to claim 22 and comprising in further combination:

said rotor includes peripheral stepped surfaces having faces parallel to said spin axis of said rotor and said peripheral stepped surfaces are wound with composite fiber.

24. A rotor for a centrifuge according to claim 22 and comprising in further combination:

said rotor is constructed of composite materials.

25. A rotor for a centrifuge according to claim 22 and comprising in further combination:

said rotor defines a cylindrical aperture.

26. A rotor for a centrifuge according to claim 22 and comprising in further combination:

said rotor is a fixed angle rotor.

27. A rotor for a centrifuge according to claim 22 and comprising in further combination:

said rotor is constructed of magnetically permeable material.

28. A centrifuge comprising:

a body;

a stator having a vertically extending, external circumferential surface and being mounted to the body;

means on said stator for generating a rotating magnetic field relative to said stator from power supplied to said stator;

a rotor defining a vertical axis and having a vertically extending, internal circumferential surface positioned opposite and surrounding the stator;

a bearing, supported by at least one of the stator and the body, supporting the rotor for rotational movement about the axis and around the stator;

the rotor including a centrifuge region for containing a material to be centrifuged; and, a controller/driver supplying the power to the stator for driving the rotor about the axis.

29. The centrifuge of claim 28 wherein the stator includes a set of electrical windings.

30. The centrifuge of claim 28 wherein the external circumferential surface of said stator is generally cylindrical.

31. The centrifuge of claim 28 wherein the bearing provides both vertical support and radial centering of the rotor.

32. The centrifuge of claim 28 wherein the rotor includes a composite body, said composite body compressing fibers within a cured resin material.

33. The centrifuge of claim 32 wherein at least some of said fibers are radially oriented so to oppose radial stresses.

34. The centrifuge of claim 32 wherein at least some of the fibers are circumferentially oriented so to oppose hoop stresses.

35. A centrifuge comprising:

a central stationary stator for producing a rotating magnetic field;

a rotor defining a vertical axis and having a vertically extending, internal circumferential surface positioned opposite and surrounding the stator;

said rotor mounted peripherally to said central stationary stator defining at least one aperture for receiving a sample for centrifugation; and, at least one bearing for mounting said rotor for rotation with respect to said stator.

36. A centrifuge according to claim 35 and further comprising:

said centrally stationary stator is a cylindrical stator; and, said rotor has a ring shaped portion defining a large central cylindrical aperture for fitting about said cylindrical stator.

37. A centrifuge according to claim 35 and further comprising:

said at least one bearing is mounted at a top of said stator for support of said rotor in rotation with respect to said stator.

38. A centrifuge according to claim 35 and further comprising:

said rotating magnetic field produced by said stator is a magnetic field exterior to said stator.

39. A centrifuge according to claim 35 and further comprising:

said rotor is concentric to said stator and includes a first section for rotating interior of said stator and a second integrally attached section having said ring shaped portion for rotating exterior of said stator.

40. A centrifuge according to claim 35 and further comprising:

said rotor is a fixed angle rotor.

41. A centrifuge according to claim 35 and further comprising:

said rotor is constructed of magnetically permeable material.

42. In a centrifuge having:

a rotor for containing at least one sample to be centrifuged;

at least one bearing for supporting and rotating said rotor; and, stator means for generating a rotating magnetic field to rotate said rotor on said bearing to centrifugate said sample; the improvement comprising:

a rotor defining a vertical axis and having a vertically extending, internal circumferential surface positioned opposite and surrounding the stator for fitting over said stator and rotating said at least one sample to be centrifugated peripherally about said stator; and, means attached to said rotor for coupling to said rotating magnetic field of said stator.

43. The improvement in a centrifuge according to claim 41 and wherein:

said stator is a cylindrical stator and said rotating magnetic field is generated exterior of said stator.

44. The improvement in a centrifuge according to claim 42 and wherein:

said at least one bearing is mounted at a top of said stator for support of said rotor in rotation with respect to said stator.

45. The improvement in a centrifuge according to claim 42 and wherein:

said rotating magnetic field produced by said stator is a rotating magnetic field for a variable reluctance motor.

46. The improvement in a centrifuge according to claim 42 and wherein:

said rotating magnetic field produced by said stator is a rotating magnetic field exterior to said stator.

47. In a centrifuge having:

a single central stator for producing a rotating magnetic field;

a rotor for containing at least one sample to be centrifuged;

means to incorporate permanent magnets into said rotor to rotate with said rotating magnetic field; and, at least one bearing for supporting and rotating said rotor;

the improvement to said rotor comprising:

a rotor defining a vertical axis and having a vertically extending, internal circumferential surface positioned opposite and surrounding the stator.

48. A rotor for a centrifuge according to claim 47 and comprising in further combination:

said rotor is symmetrical about a spin axis;

said rotor includes peripheral stepped surfaces having faces parallel to said spin axis of said rotor and said peripheral stepped surfaces are wound with composite fiber.

49. A rotor for a centrifuge according to claim 47 and comprising in further combination:

said rotor is constructed of composite materials.

50. A rotor for a centrifuge according to claim 47 and comprising in further combination:

said rotor defines a cylindrical aperture.

51. A rotor for a centrifuge according to claim 47 and comprising in further combination:

said rotor is a fixed angle rotor.

52. A rotor for a centrifuge according to claim 47 and comprising in further combination:

said rotor is constructed of magnetically permeable material.

* * * * *